Oct. 26, 1943.  H. SCHMIDBERGER  2,332,937
MOLDING PRESS
Filed May 28, 1940
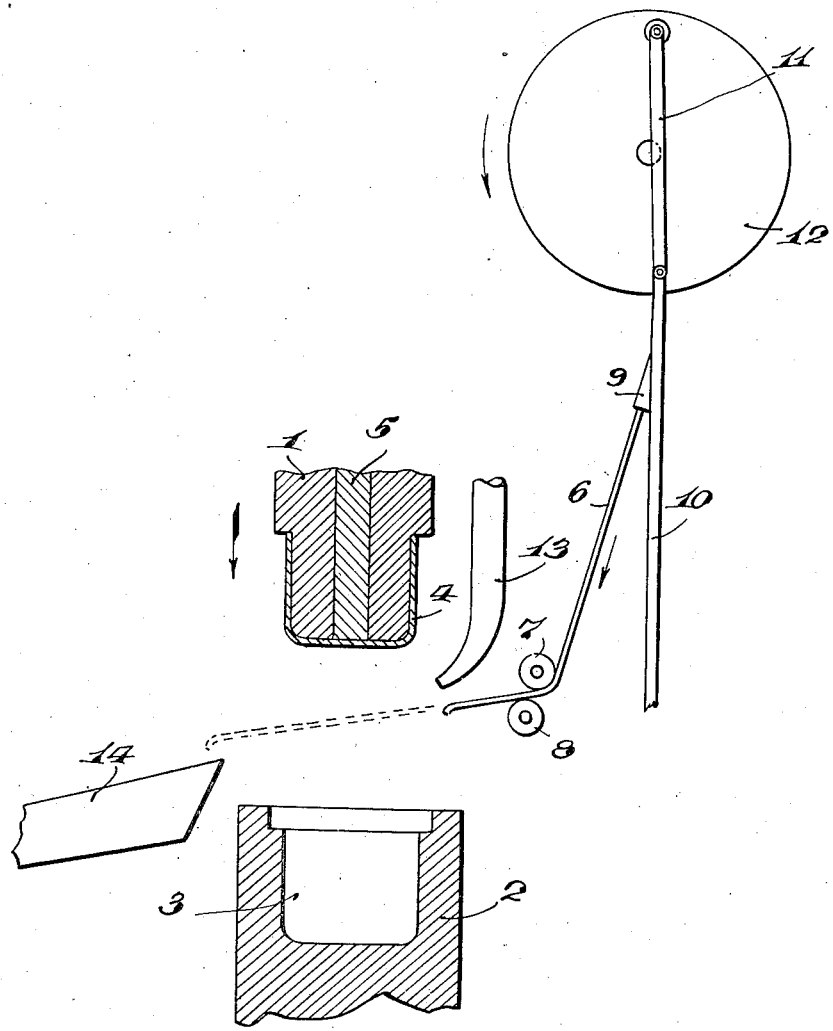
Inventor
Heinrich Schmidberger
By Allenholcombe
Attorney.

Patented Oct. 26, 1943

2,332,937

UNITED STATES PATENT OFFICE 2,332,937

MOLDING PRESS

Heinrich Schmidberger, Vienna, Germany; vested in the Alien Property Custodian

Application May 28, 1940, Serial No. 337,675
In Germany April 29, 1939

1 Claim. (Cl. 18—16)

The present invention relates to improvements in or relating to machines or apparatus for the manufacture of molded and pressed articles, and more especially but not necessarily exclusively to completely automatic presses for artificial resins.

For the production of pressed moldings a molding powder is usually employed as starting material. This mass is filled into the mold by means of suitable charging devices and then subjected to a strong pressing between a matrix and a plunger. In many cases, in particular in the production of pressed bodies from urea derivatives, phenol condensation products, or other artificial resins, this pressing is combined with a heating whereby the press material within the mold is softened and additionally polymerised. As soon as the pressed article is ready, the mold is opened and the pressed article ejected.

In semi-automatic presses of this kind the ejectors are often fitted in the lower mold plate, so that they lift up the pressed article and thereby enable it easily to be taken out of the press. By selecting an appropriate mold it is possible to determine beforehand the part of the mold to which the pressed article adheres on opening the press. It can thus be arranged for the pressed article to remain attached to the upper part of the mold on opening the mold. The ejector is then provided on the upper part of the mold.

The present invention is concerned with molds, molding presses and the like especially completely automatic artificial resin molding presses which operate in this second manner and it is an object of the invention to provide in or for such a machine, a device for receiving the molded articles as they are detached from the plunger or the like and removing them. It is a further object of the invention to provide such a device which acts to prevent waste material such as crumbs broken away from the edges of the articles from falling on to the lower mold part. It is a further object of the invention to provide such a device which is automatic in operation.

According to the present invention a receiving plate is provided for removing molded articles from the molds, molding presses or the like having vertically separable mold parts, and means for bringing said plate or the like underneath the upper mold part upon separation of the mold parts and for causing removal of articles received by said plate or the like therefrom.

A device as above set forth may be arranged so as to operate automatically upon operation of the mold or molding press. Thus, for example, the arrangement may be such that upon separation of the mold parts a receiving plate, tray or the like is moved between the mold parts whereupon a suitable ejecting or detaching device removes the molded article or articles from the upper mold part so that the article or articles drops or drop on to the plate, tray or the like. Thereupon, if desired, after the plate, tray or the like has been moved from between the mold parts the article or articles may be removed therefrom by any suitable means, for example by means of a suitable brushing or sweeping device, by means of a blast of air, or by tilting the plate or tray. If a blast of air is employed it may serve at the same time for blowing any dust, powder or fragments from the mold parts, especially the upper one and for blowing such waste material and separating it from the articles. The said plate or the like may be moved in any suitable manner for example it may be rotated, oscillated or reciprocated into and out of position between the mold parts. In one form of the device the plate or the like, may be passed under a suitable brush, sweeper or the like adapted to sweep articles from the plate or the like but, if desired, a brush sweeper or the like could be moved over the plate or the like.

The plate, tray or the like is preferably made or coated with a suitable yieldable and/or resilient material such for example as rubber or leather in order to reduce the risk of breakage or chipping of the articles.

Any suitable means may be provided for detaching or ejecting the articles from the upper mold part.

The articles removed from the plate, tray or the like may, if desired, be received by any suitable chute, conveyor or receptacle.

In order that the invention may be well understood the preferred embodiment thereof will now be described by way of example with reference to the accompanying drawing in which:

The figure is a diagrammatic view partly in section of a press employing an appropriate form of article receiving means.

Referring to the drawing, the plunger 1 reciprocates vertically over the matrix 2 mounted on a base not illustrated. The matrix has a cavity 3 which receives the desired amount of molding composition for each article 4 to be made.

The article when molded adheres to the plunger on its upward movement.

The plunger contains a movable ejector 5 by which the article is separated from the plunger when the latter reaches its upper limit of movement.

To the right of the plunger is arranged a movable plate 6, preferably of leather, which is guided between rollers 7 and 8. The upper end of the plate 6 is clamped as at 9 to a rod or the like 10. This rod is reciprocated vertically by suitable means such as a conventional connecting rod 11 and crank 12. The crank 12 is rotated in synchronism with the plunger so that the plate 6 is advanced to a position between the plunger and matrix when the plunger rises, the advanced position being indicated in dotted lines.

A nozzle 13 is located at the side of the plunger and over the plate 6 and delivers a jet of air under pressure laterally over the plate. On the opposite side of the plunger is a chute 14.

The operation is readily understood from the above. On retraction of the plunger carrying the molded article, the plate is advanced. The ejector causes the molded article to fall on the plate together with any excess molding material or small fragments, dust and the like.

The jet from the nozzle conveys the article and all fragments and waste materials to the chute 14 and out of danger of falling into the matrix.

The plate 6 then retracts and permits the matrix to receive a new charge for molding on the next lowering of the plunger.

I claim:

In a molding press of the class described which includes a fixed matrix for receiving moldable material and a plunger disposed above said matrix for vertical reciprocating motion relative thereto to form an article from said material during its downstroke, a strip of resilient non-metallic material depending downwardly alongside said plunger with its free lower end disposed in a horizontal plane just above said matrix, a plurality of guide rollers holding said free lower end of the strip, and means secured to the upper end of said strip for moving it downwardly during the return stroke of said plunger to insert its free lower end between the matrix and plunger for receiving said article discharged from the plunger.

HEINRICH SCHMIDBERGER.